US010482156B2

(12) United States Patent
Diril et al.

(10) Patent No.: US 10,482,156 B2
(45) Date of Patent: Nov. 19, 2019

(54) SPARSITY-AWARE HARDWARE ACCELERATORS

(71) Applicant: Facebook, Inc., Menlo Park, CA (US)

(72) Inventors: Abdulkadir Utku Diril, Menlo Park, CA (US); Jong Soo Park, Mountain View, CA (US); Nadav Rotem, Santa Clara, CA (US); Mikhail Smelyanskiy, Burlingame, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/857,918

(22) Filed: Dec. 29, 2017

(65) Prior Publication Data
US 2019/0205358 A1    Jul. 4, 2019

(51) Int. Cl.
*G06F 17/16* (2006.01)
*G06N 3/063* (2006.01)
*G06F 7/544* (2006.01)
*G06N 3/04* (2006.01)

(52) U.S. Cl.
CPC ............ *G06F 17/16* (2013.01); *G06F 7/5443* (2013.01); *G06N 3/0481* (2013.01); *G06N 3/063* (2013.01)

(58) Field of Classification Search
CPC ............................. G06F 17/16; G06F 7/5443
USPC ................................................ 708/603, 607
See application file for complete search history.

(56) References Cited

U.S. PATENT DOCUMENTS 10,186,011 B2 * 1/2019 Nurvitadhi ............... G06T 1/20
2018/0189056 A1 * 7/2018 Turakhia ............. G06F 9/3001

OTHER PUBLICATIONS

S. Han, et al., EIE: Efficient Inference Engine on Compressed Deep Neural Network, 2016 ACM/IEEE 43rd Annual International Symposium on Computer Architecture, IEEE Computer Society,2016 (Year: 2016).*
A.K. Mishra, et al., Fine-Grained Accelerators for Sparse Machine Learning Workloads,2017 22nd Asia and South Pacific Design Automation Conference (ASP-DAC) IEEE, Feb. 20, 2017 (Year: 2017).*

(Continued)

*Primary Examiner* — Andrew Caldwell
*Assistant Examiner* — Emily E Larocque
(74) *Attorney, Agent, or Firm* — FisherBroyles, LLP

(57) ABSTRACT

A special-purpose, hardware-based accelerator may include an input subsystem configured to receive first and second vectors as operands of a full dot-product operation. The accelerator may also include a sparsity-aware dot-product engine communicatively coupled to the input subsystem and configured to perform adaptive dot-product processing by: (1) identifying, within the first and second vectors, at least one zero-value element and (2) executing, in response to identifying the zero-value element, a reduced dot-product operation that excludes, relative to the full dot-product operation, at least one mathematical operation in which the zero-value element is an operand. The accelerator may also include an output subsystem that is communicatively coupled to the sparsity-aware dot-product engine and configured to send a result of the reduced dot-product operation to a storage subsystem. Various other accelerators, computing systems, and methods are also disclosed.

20 Claims, 7 Drawing Sheets

(56) References Cited

OTHER PUBLICATIONS

J.K. Kim, et al., FPGA-Based CNN Inference Accelerator Synthesized from Multi-Threaded C Software, 2017 30th IEEE International System-on-Chip Conference (SOCC), IEEE, Dec. 21, 2017 (Year: 2017).*
Chang, et. al, "Hardware accelerators for Recurrent Neural Networks on FPGA," Circuits and Systems (ISCAS), 2017 IEEE International Symposium on, May 28-31, 2017.
Kim et. al, "FPGA-Based CNN Inference Accelerator Synthesized from Multi-Threaded C Software," System-on-Chip Conference (SOCC), 2017 30th IEEE International, available at www.legupcomputing.com/static/pdfs/IEEE_SOCC_FINAL.pdf.
Kiningham et. al, "Design and Analysis of a Hardware CNN Accelerator," available at cs231n.stanford.edu/reports/2017/pdfs/116.pdf.
Warden, Pete, "Why GEMM is at the heart of deep learning," available at petewarden.com/2015/04/20/why-gemm-is-at-the-heart-of-deep-learning/.

* cited by examiner

US 10,482,156 B2

SPARSITY-AWARE HARDWARE ACCELERATORS

BACKGROUND

Artificial intelligence (AI) can enable computers to perform various complicated tasks, such as tasks related to cognitive functions that are typically associated with humans. Several approaches to AI are prevalent, including machine learning techniques. In machine learning systems, a computer may be programmed to parse data, learn from the data, and make predictions from real-world inputs. Some machine-learning algorithms may use known data sets to train a computer to perform a task rather than explicitly programming the computer with a particular algorithm for performing the task. One machine-learning model, referred to as an artificial neural network, was inspired by the interconnections of neurons in a biological brain.

Neural networks are modeled after neurons, using connected layers similar to connected neurons. Each layer may receive an input, process the input, and pass an output to the next layer until the final layer produces a final output. Each layer may also assign a weight to its input. For example, if a task involves identifying a particular object in an image, filter weights may be trained to correspond to a probability that the input matches the particular object. While calculations performed at these various layers may be computationally intensive, the advent of dedicated processing units has made processing these neural network layers more feasible, especially for complex tasks related to computer vision or natural language processing.

However, even with the use of specialized processing hardware, such as accelerators that perform the computations of each network layer, deep learning may tax existing computing systems, including those with highly efficient matrix-multiplication units. Since AI and other systems are often heavily dependent on vector- and matrix-multiplication operations (e.g., dot-product operations), what is needed, therefore, are improved systems for performing matrix-multiplication operations.

SUMMARY

As will be described in greater detail below, the instant disclosure details various systems and methods for optimizing dot-product multiplication using processing elements that may identify, and take advantage of, sparsity (e.g., having zero-value elements) within input vectors and matrices. In some embodiments, a hardware accelerator may include logic (e.g., a multiplexer) that identifies zero-value elements in dot-product input matrices and removes these elements from a dot-product processing stream. In other words, the hardware accelerator may be configured to send only non-zero matrix elements to a dot-product engine for processing. Since the computational power involved in identifying zero-value elements may be less than the computational power needed to perform multiply-and-accumulate operations, dropping zero-value elements from dot-product computations may increase processing efficiency and provide a variety of other advantages.

In some embodiments, a special-purpose, hardware-based accelerator may include an input subsystem configured to receive first and second vectors (e.g., number sequences from data and filter matrices of a neural network layer) as operands of a full dot-product operation. The accelerator may also include a sparsity-aware dot-product engine communicatively coupled to the input subsystem and configured to perform adaptive dot-product processing by (1) identifying, within the first and second vectors, at least one zero-value element and (2) executing, in response to identifying the zero-value element, a reduced dot-product operation that excludes, relative to the full dot-product operation, at least one mathematical operation (e.g., a multiply and/or accumulate operation) in which the zero-value element is an operand. In addition, the accelerator may include an output subsystem that is communicatively coupled to the sparsity-aware dot-product engine and configured to send a result of the reduced dot-product operation to a storage subsystem.

The accelerator may identify zero-value elements in a variety of ways. For example, the accelerator may include a sparsity-aware logical unit capable of identifying single zero-value elements or zero-value pairs of elements (e.g., dot-product computational pairs). In some examples, the sparsity-aware logical unit may be a multiplexer that is configured to identify sparsity. This multiplexer (or other logical element) may be disabled in situations where identifying sparsity could involve more computational power than would be saved by skipping dot-product operations for zero-value elements. For example, the accelerator may determine that at least one of the first and second vectors are from dense (e.g., having mostly non-zero elements) matrices with fewer than a predetermined number of zero-value elements, and in response to determining that at least one of the first and second vectors are from dense matrices, disable the sparsity-aware logical unit.

While the accelerator may improve processing efficiency (e.g., via reduction of power consumption) by skipping non-zero elements in dot-product operations, the accelerator may further increase dot-product calculation efficiency in a variety of ways. For example, the sparsity-aware dot-product engine may include queues for a plurality of processing units (e.g., logical units configured to perform multiply-accumulate operations) and load-balancing logic configured to, based on an evaluation of the queues, distribute computational pairs of elements from the first and second vectors among the plurality of processing units. As another example, the accelerator may include an inline cache configured to store and accumulate partial sums of output from the plurality of processing units. Caching and accumulating partial sums inline (e.g., within an output bus architecture of the sparsity-aware dot-product engine), instead of storing them in a static random access memory (SRAM) device, may save the overhead associated with reading and writing to SRAM to accumulate each partial sum.

Embodiments of the instant disclosure may also be implemented in a computing system (e.g., a general-purpose computing system). The computing system may include a memory device configured to store first and second matrices (e.g., matrices associated with a neural network layer) and a hardware processor configured to identify a vector of the first matrix (i.e., a first vector) and a vector of the second matrix (i.e., a second vector) as operands of a full dot-product operation. The computing device may also include a sparsity-aware dot-product accelerator communicatively coupled to the hardware processor and configured to perform adaptive dot-product processing by (1) identifying, within the first and second vectors, at least one zero-value element and (2) executing, in response to identifying the zero-value element, a reduced dot-product operation that excludes, relative to the full dot-product operation, at least one mathematical operation in which the zero-value element is an operand. The computing system may also include an output subsystem that is communicatively coupled to the sparsity-aware dot-product engine and configured to send a result of the reduced dot-product operation to a storage subsystem (e.g., a memory device of the computing system, a cache of dot-product accelerator, etc.).

The dot-product accelerator may be configured to eliminate (e.g., skip) one or more of a variety of types of mathematical operations for a zero-value element. For example, the dot-product accelerator may skip a multiply calculation, an accumulation calculation, a multiply-accumulate operation, etc. Furthermore, the dot-product accelerator may be configured to skip any number of operations associated with zero-value elements. For example, the dot-product accelerator may skip multiply-accumulate operations for every zero-value element in the first vector, for every zero-value element in the second vector, or for any calculation involving a zero-value element from either vector.

The computing system may also include a density-aware logical subsystem configured to determine that at least one of first and second matrices are dense (e.g., are matrices with fewer than a predetermined number of zero-value elements). The density-aware logical unit may, in response to identify one or both of the input matrices as being dense, disable (e.g., bypass) the sparsity-aware logical unit to save the time and energy involved in evaluating sparsity since the dot-product engine may only realize minimal benefits from skipping a relatively small number of sparse matrices.

The computing system may also include one or more additional elements to further improve the efficiency of the sparsity-aware dot-product accelerator. For example, the computing system may implement processing queues for one or more multiply-accumulate processing units of the accelerator. The computing system may also include a load-balancing subsystem that distributes, based on an evaluation of the processing queues, computational pairs of elements from the first and second vectors among the plurality of processing units. As another example of an element that may enhance efficiency, the computing system may include an inline cache configured to store and accumulate partial sums of output from the plurality of processing units.

In addition to the computing system and accelerator described above, the instant disclosure presents a method for improving dot-product calculations via sparsity-aware hardware. The method may include receiving first and second vectors as operands of a full dot-product operation. The method may also include performing, by a sparsity-aware dot-product accelerator, adaptive dot-product processing by (1) identifying, within the first and second vectors, at least one zero-value element, (2) executing, in response to identifying the zero-value element, a reduced dot-product operation that excludes, relative to the full dot-product operation, at least one mathematical operation (e.g., a multiply-accumulate operation) in which the zero-value element is an operand, and (3) sending a result of the reduced dot-product operation to a storage subsystem.

In at least one example of the method, a sparsity-aware logical unit of the sparsity-aware dot-product engine may have identified the zero-value element. In this example, the method may further include determining that at least one of the first and second vectors are from dense matrices (e.g., matrices with fewer than a predetermined number of zero-value elements), and in response to determining that at least one the first and second vectors are from dense matrices, disabling the sparsity-aware logical unit. Additionally or alternatively, the method may be implemented in processing a layer of a neural network. In this example, the first vector may be from a data matrix of a layer of the neural network layer and the second vector may be from a filter matrix for the neural network layer.

The method may, in some embodiments, further optimize sparsity-aware dot-product operations by (1) queuing non-zero element pairs of the first and second matrices in queues of multiply-accumulate elements of the dot-product engine and (2) performing load-balancing by distributing, based on an evaluation of the processing queues, corresponding pairs of elements from the first and second matrices among the plurality of processing units. Additionally or alternatively, the method may include caching one or more of the partial sum outputs of the processing elements in an inline cache within the dot-product engine or in an output bus of the dot-product engine.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
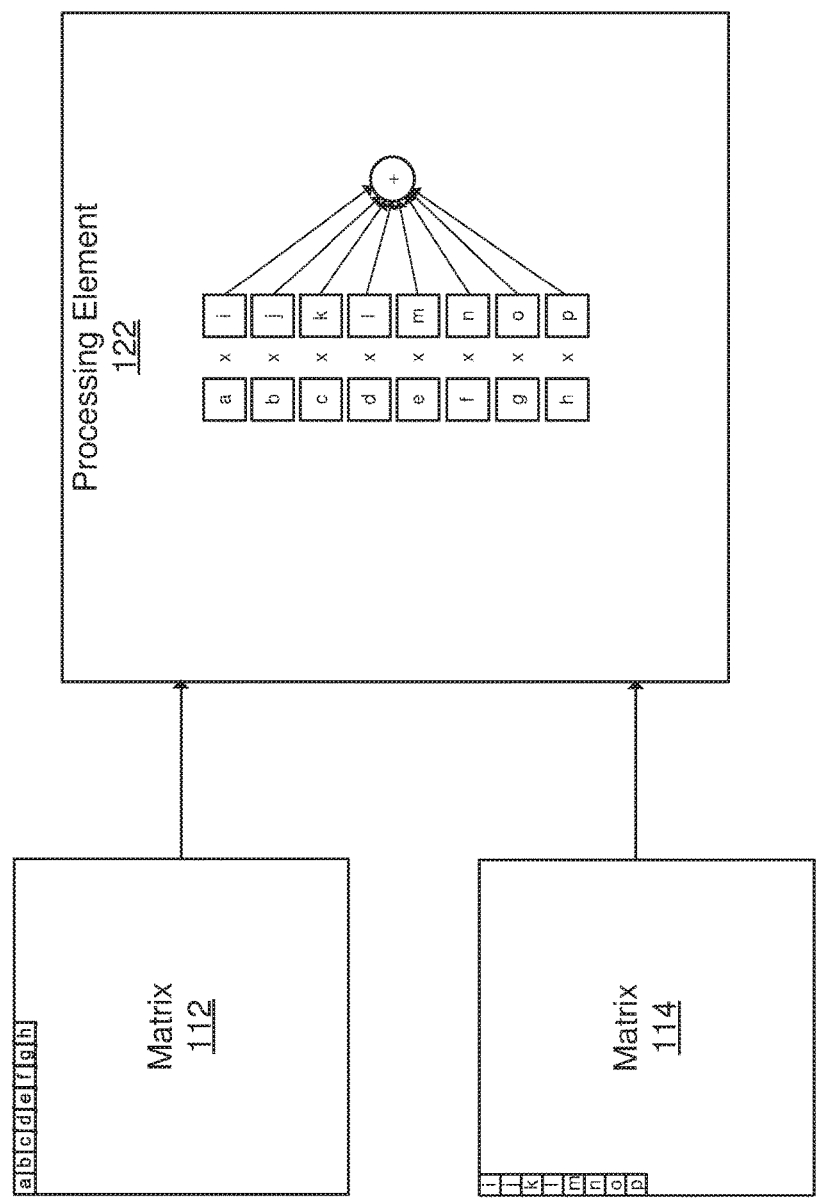
FIG. 1 is a diagram of a processing element of a dot-product engine.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to performing dot-product calculations using a sparsity-aware dot-product processing system. Such a system, which may be implemented within a hardware accelerator, may distinguish between zero-value elements and non-zero elements of input matrices. Sparsity-aware dot-product systems may take advantage of sparsity within input matrices to improve processing efficiency by skipping operations that include zero-value elements. In other words, sparsity-aware dot-product systems may send only non-zero matrix elements to a dot-product engine for processing, which may reduce the number of operations performed in a dot-product calculation.

Dropping zero-value elements from dot-product computations may provide a variety of advantages over traditional systems. For example, since multiplication operations involving at least one zero-value element typically result in an output value of zero, excluding such operations may not affect a dot-product output. Furthermore, the overhead involved in identifying zero-value elements may be minimal relative to dot-product multiplication operations. Thus, sparsity-aware dot-product processing may increase processing efficiency without decreasing dot-product processing precision. Embodiments of the instant disclosure may also reduce memory usage, reduce energy consumption and heat generation, and/or provide a variety of other features and benefits in neural network processing, graph analytics, stytolic systems, and/or in any other system that performs dot-product calculations.

Figure 2:
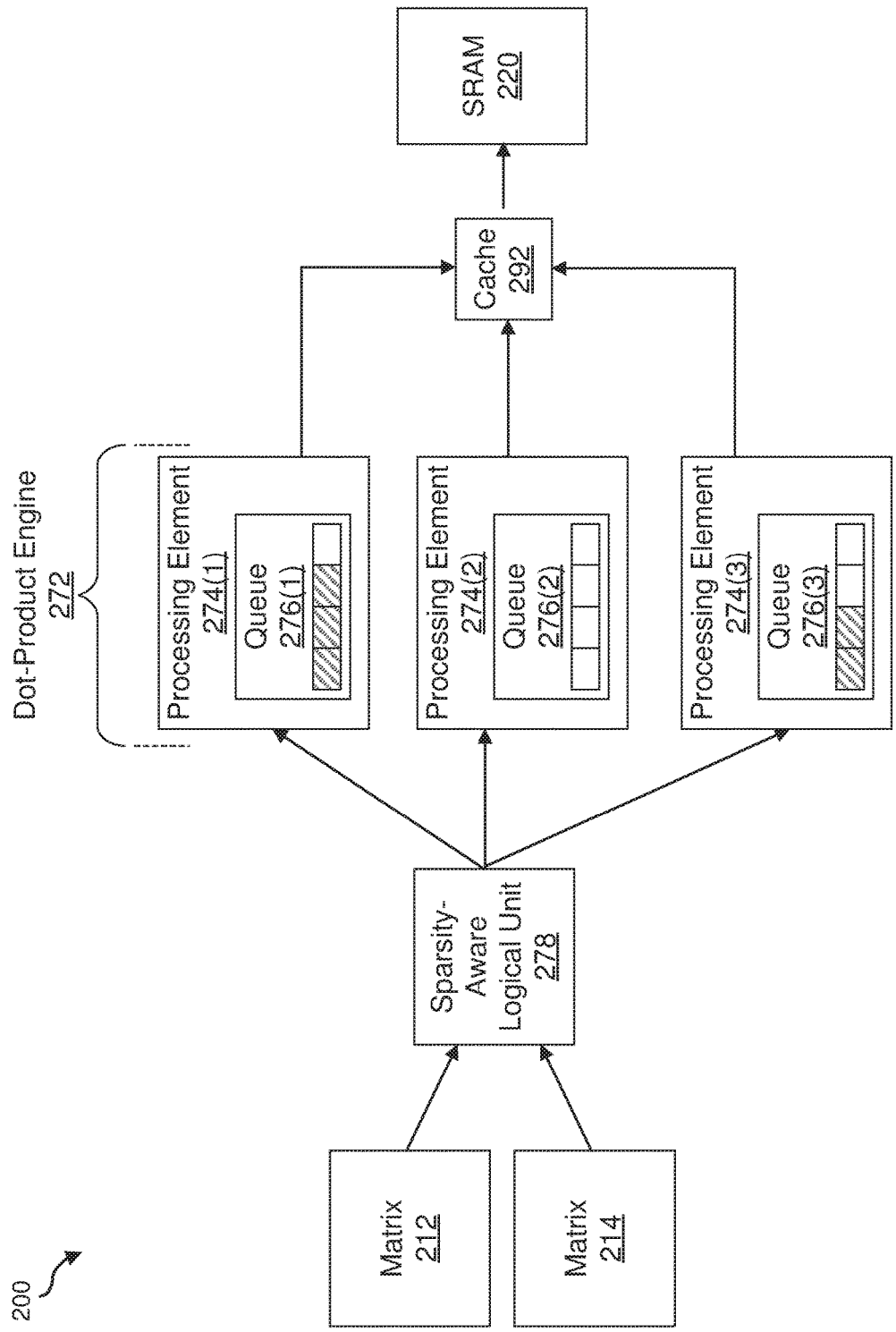
FIG. 2 is a diagram of a dot-product engine with queues for load balancing among sparsity-aware processing elements.
Figure 3:
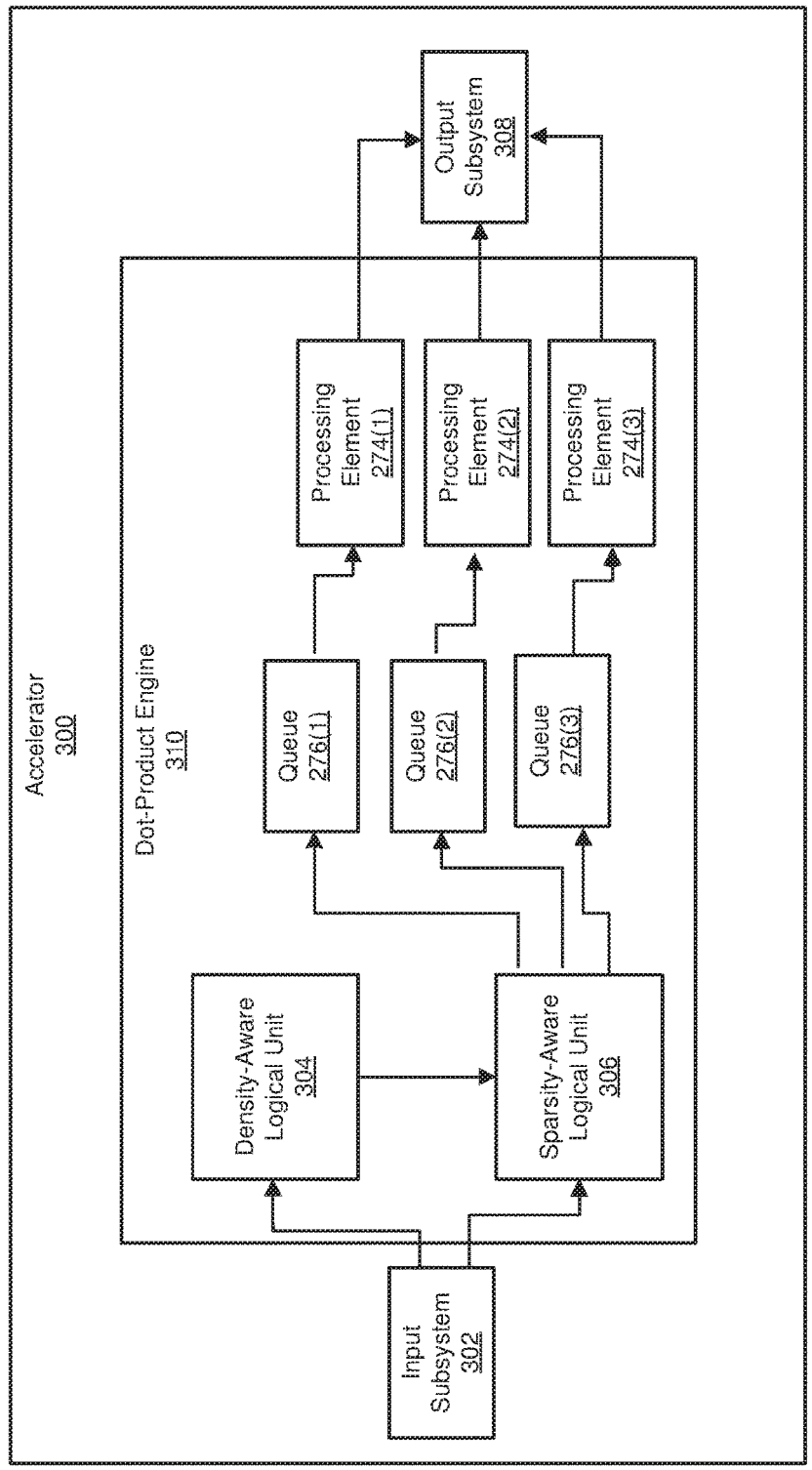
FIG. 3 is a block diagram of an exemplary accelerator configured to implement sparsity-aware dot-product processing.
Figure 4:
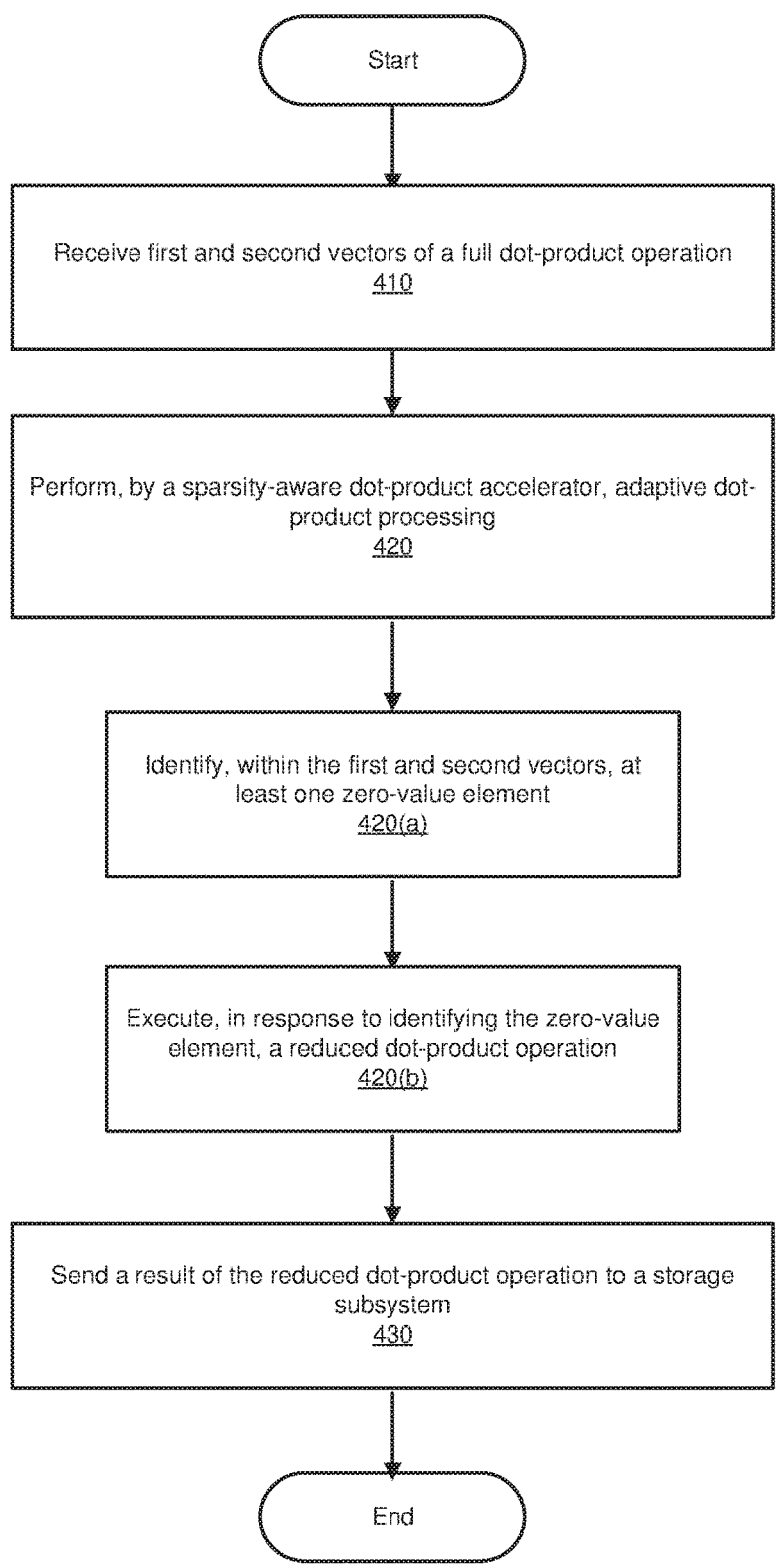
FIG. 4 is a flow diagram of an exemplary method for performing dot-product multiplication using sparsity-aware processing elements.
Figure 5:
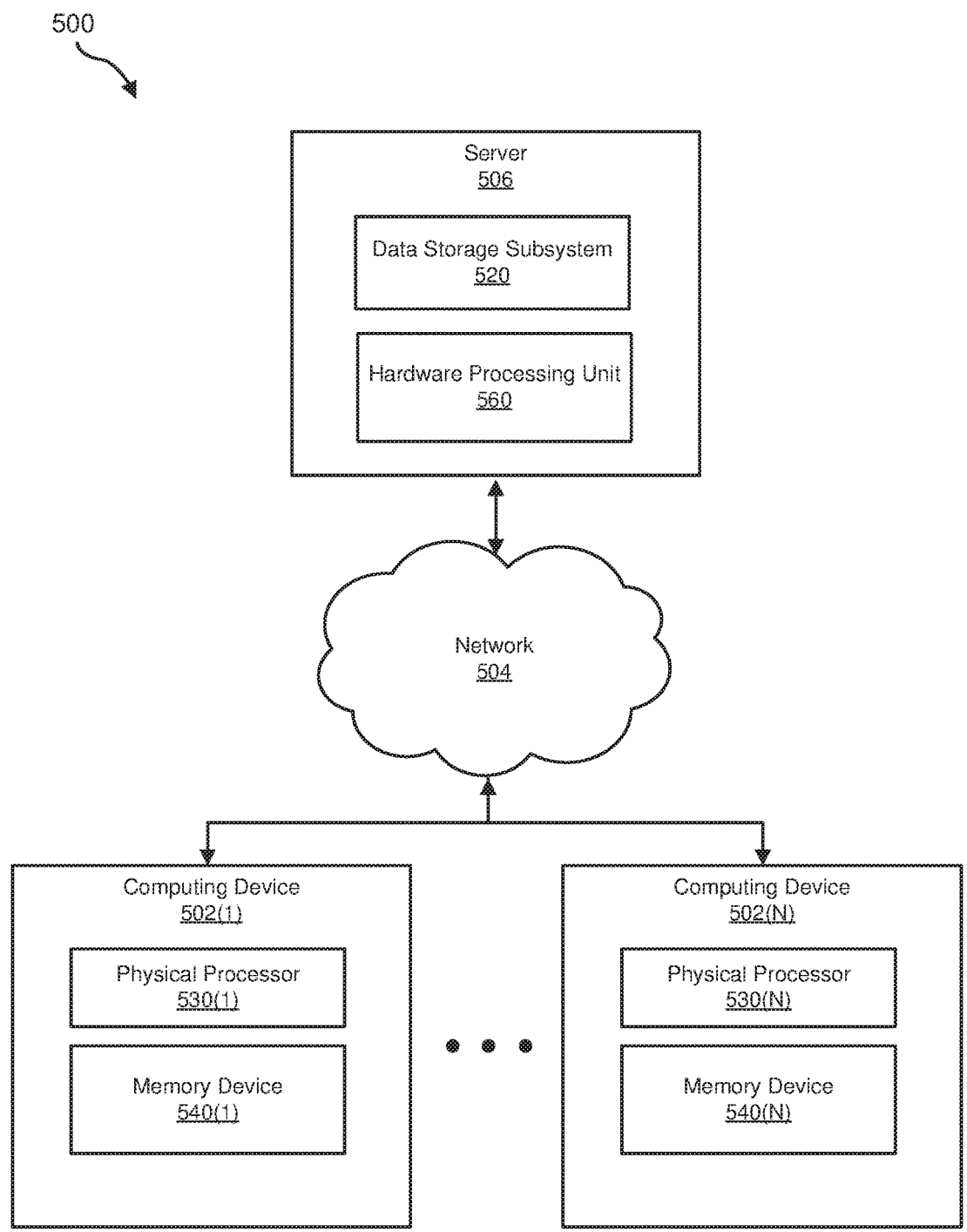
FIG. 5 is a block diagram of an exemplary system in which a dot-product engine with sparsity-aware processing elements may be included.

Turning to the figures, the following will provide, with reference to FIG. 1, an example of a processing element of a dot-product engine. The discussion of FIG. 2 provides an overview of how a dot-product engine may leverage sparsity-awareness to increase processing efficiency, and the discussion of FIG. 3 presents an exemplary accelerator according to aspects of the present disclosure. The discussion corresponding to FIG. 4 presents a method for performing sparsity-aware dot-product processing, and the description of FIG. 5 presents an exemplary context in which sparsity-aware dot-product processing may be implemented. The following also provides, with reference to FIG. 6, a discussion of exemplary neural networks that may leverage sparsity-aware processing of network layers. With reference to FIG. 7, the following disclosure presents an example of a computing system in which the hardware accelerator of FIG. 3 may be installed.

As noted, embodiments of the instant disclosure may be implemented in various types of dot-product processing systems, and the basic building block of these systems may be a dot-product processing element. FIG. 1 shows an example of a dot-product processing element 122 that may perform multiply and accumulate operations on rows and columns of matrices 112 and 114. Processing element 122 may be one of any number of processing elements that may be part of a dot-product engine.

The term "dot product," in some examples, may generally refer to any algebraic operation that processes two sequences of numbers and returns a single number. In other words, a dot product may be a sum of the products of corresponding entries of two different number sequences or vectors. Alternatively, while the dot-product calculations discussed herein are presented primarily in algebraic terms, a dot product may also be described geometrically in terms of angle and distance (i.e., in terms of the magnitude of vectors). In some contexts, a dot product may be referred to as a scalar product or an inner product.

In the example shown in FIG. 1, a first sequence of values for a dot product may be taken from a first row of matrix 112 (e.g., values a, b, c, d, e, f, g, and h), and a second sequence of values for the dot product may be taken from a first column of matrix 114 (e.g., values i, j, k, l, m, n, o, and p). Processing element 122 may multiply corresponding elements of these sequences (e.g., a*i, b*j, c*k, d*l, e*m, f*n, g*o, and h*p) and may accumulate (i.e., sum) the resulting products to create a partial sum of the dot product of the first row of matrix 112 and the first column of matrix 114. This multiply-accumulate operation may be repeated as many times as necessary to process the remaining values in the first row of matrix 112 and the first column of matrix 114, and the partial sum results from each of these multiply-accumulate operations may be added together to provide a final, single value result.

While FIG. 1 shows an example of performing dot-product operations on a two-dimensional matrix, dot-product operations may also be performed in the context of three-dimensional matrices and/or one-dimensional matrices (e.g., individual vectors). Furthermore, the values or numbers within these matrices may be referred to herein as elements. The term "element," in some embodiments, may refer to any unit of any suitable type or form of data. For example, the term "element" may refer to a unit of data that represents one or more sections, pieces, elements, or components of information (e.g., a value, or set of values, that represents a pixel of an image).

As discussed above, embodiments of the instant disclosure may identify zero-value elements within matrices. The term "sparse," in some examples, may refer to an element having a value of zero, an element pair with one or both elements having a value of zero, a matrix in which some or many of the elements are zero, a vector having one or more zero values, etc. Conversely, the term "non-sparse" may refer to an element having a non-zero value, a pair of elements that each have non-zero values, a matrix or vector in which some or many of the elements are non-zero, etc.

Returning to the example shown in FIG. 1, either or both of matrices 112 and 114 may have one or more zero-value elements. For example, element a in matrix 112 may be a zero-value element, which means that no matter what value element i has, the product of a and i will be zero. In this example, the first multiplication operation (a*i) depicted in the dot-product calculation in processing element 122 would be zero and would not affect the output of processing element 122 for a dot product of vectors with values a, b, c, d, e, f, g, h and i, j, k, l, m, n, o, and p. In traditional dot-product systems, a multiply-accumulate operation for the zero-value element pair a, i would still be performed, essentially wasting computational power of processing element 122.

In contrast, embodiments of the instant disclosure may use preprocessing logic to identify zero-value elements and exclude them from dot-product processing. Implementing sparsity-aware dot-product processing, in which only non-zero element pairs may be sent to processing elements of a dot-product engine, may eliminate wasted operations and may, for some input matrices, significantly reduce the number of multiply and/or accumulate operations that are needed to calculate a dot product.

While skipping multiply-accumulate operations for zero-value element pairs may increase efficiency by reducing the number of computations performed by a sparsity-aware dot-product engine, the sparsity-aware dot-product engine may still, depending on the frequency and distribution of sparsity within the input matrices, perform the same number of processing cycles as a traditional dot-product engine. For example, in a system with multiple processing elements capable of handling eight simultaneous multiply-accumulate operations, a first processing element may be assigned 24 non-zero element pairs and may complete processing in three cycles, while a second processing element may be assigned eight non-zero element pairs and complete processing in a single cycle. Thus, the second processing element may be idle for two cycles while waiting for the first processing element to finish.

As another example, with reference to FIG. 1, processing element 122 may be able to process eight elements from each input matrix at a time (e.g., processing element 122 may be able to process eight multiply and accumulate operations at a time). Input matrices may have various row lengths, and in the example shown in FIG. 1, matrix 112 may have a row length greater than eight and matrix 114 may have a column height greater than eight (e.g., matrices 112 and 114 may be 96×96). In this example, processing element 122 may calculate each pair of matrix elements piecemeal and then accumulate the four resulting partial sums. Thus, processing element 122 may require 12 cycles (processing eight elements each cycle) to complete the row/column processing in this example. Alternatively, multiple processing elements may operate in parallel to compute a complete row/column summation. Each partial sum from the processing elements may be added together to calculate a final result value. For example, if four instances of processing element 122 are available to process 96×96 input matrices, the four instances of processing elements 122 may only need four cycles to handle the multiply-accumulate operations in parallel. However, if processing elements are sparsity-aware, one or more of the instances of processing element 122 may skip one or more multiply-accumulate operations and be left waiting on other instances to finalize their partial sums.

To address these types of processing inefficiencies, the systems and methods disclosed herein may implement a load-balancing scheme. An example implementation of load balancing with sparsity-aware processing elements, according to aspects of the present disclosure, is described with respect to FIG. 2. FIG. 2 shows a queuing scheme 200 with a matrix 212, a matrix 214, a sparsity-aware logical unit 278, a dot-product engine 272, and an SRAM device 220. Matrix 212 may be a first input matrix, such as a data matrix with values to be evaluated by a neural network. Matrix 214 may be a second input matrix, such as a filter map for an activation layer.

Dot-product engine 272 may be a logical unit configured to perform dot-product multiplication on matrices and may include one or more processing elements, such as processing element 274(1), processing element 274(2), and processing element 274(3). Each processing element may include queues 276(1)-(3), which may be first-in, first-out FIFO queues or any other suitable type or form of queue. A FIFO queue may be a queue in which elements are removed (and processed) in an order they were added to the queue. Thus, the temporally oldest elements may be the first to be addressed from the queue. In addition to queues and processing elements, dot-product engine 272 may also include other logical elements (e.g., state machines and/or multiplexers for identifying sparsity, queuing logic, etc.).

As shown in FIG. 2, sparsity-aware logical unit 278 may provide inputs to dot-product engine 272, and dot-product engine 272 may process the inputs and provide outputs via a bus, which may be associated with (e.g., may include, may be connected to, etc.) a cache 292 and SRAM 220.

In one example of how data may be processed in the queuing scheme of FIG. 2, matrix 212 and/or matrix 214 may include numerous zero-value elements. For row/column pairs of rows of matrix 212 and columns of matrix 214, sparsity-aware logical unit 278 (or any other suitable logical unit) may forward non-zero element pairs to dot-product engine 272. Inputs to dot-product engine 272 may be distributed among processing elements 274(1)-(3) in any other suitable manner. For example, for a column of matrix 214, rows of matrix 212 may be iterated through before continuing to a next column of matrix 214, and although not shown, a controller or other processing unit may coordinate queuing the output of sparsity-aware logical unit 278 to processing elements 274(1)-274(3).

Continuing with the example provided above in connection with FIG. 2 (i.e., input matrices that are 96×96 and three processing elements that are eight elements wide each), each processing element 274(1)-(3) may process one-third (e.g., 32) of the multiplication operations for a row and column pair, which may take four cycles to process in conventional systems. In such systems, each of processing elements 274(1)-(3) would finish processing in four cycles, and no individual processing element would be idle while waiting on other elements to complete.

Due to the possible reduction of processing cycles that may be realized by skipping zero-value element pairs, one or more of processing elements 274(1)-(3) may complete processing in less than four cycles. With serial distribution of rows and no load balancing, one or more of processing element 274(1)-(3) may continue processing for one or more cycles while one or more of the other processing elements may be available and idle.

To facilitate load balancing (and to prevent or reduce stalling), processing elements 274(1)-(3) may include one or more queues 276(1)-(3). Rather than distributing the matrix rows serially to processing elements 274(1)-(3) for computation, the sets of computations may be distributed based on availability of processing elements 274(1)-(3). As rows are distributed to processing elements 274(1)-(3), respective queues 276(1)-(3) may be filled. As processing elements 274(1)-(3) process elements from their respective queues 276(1)-(3), queues 276(1)-(3) may be emptied. Thus, availability of processing elements 274(1)-(3) may be determined by how full their respective queues 276(1)-(3) are. For example, processing element 274(2) may have an empty queue 276(2) and therefore be selected for a next row of computations. If no processing elements 274(1)-(3) have empty queues, then one of processing elements 274(1)-(3) with the smallest queue may be selected. For example, between processing element 274(1) and processing element 274(3), processing element 274(3) may be selected as it has a smaller queue 276(3). Any other suitable load-balancing and/or queuing scheme may also be implemented.

As each of processing elements 274(1)-(3) completes processing, each of processing elements 274(1)-(3) may send its partial sum to a bus to be written to SRAM 220. Because each processing element 274(1)-(3) may complete calculating partial sums asynchronously, accumulating the partial sums may involve repeated accesses to SRAM 220 as each processing element finished calculating its partial sum. To reduce or minimize accesses to SRAM 220, dot-product engine 272 and/or an output bus from dot-product engine 272 may use an inline cache 292 to accumulate partial sums until a complete sum is accumulated and ready for writing to SRAM 220. In this way, an inline cache may reduce reads and/or writes to SRAM 220, thereby preserving memory bandwidth and reduce power consumption. Furthermore, in this example, highly sparse matrices may be evaluated in as few as a single cycle (e.g., a 4× savings over conventional systems), while other matrix operations may have smaller, but still significant saving (e.g., matrix multiplications may complete in two or three cycles instead of four cycles).

FIG. 3 shows an accelerator 300 which may implement aspects of the present disclosure, including the load-balancing scheme described above. Accelerator 300 may include an input subsystem 302, a density-aware logical unit 304, a sparsity-aware logical unit 306, queues 276(1)-(3), a dot-product engine 310, and an output subsystem 308. As shown, dot-product engine 310 may include processing elements 274(1)-(3).

Input subsystem 302 and output subsystem 308 generally represent one or more circuits, controllers, interfaces, busses, and/or other devices or systems for sending and/or receiving and/or processing data at accelerator 300. For example, in examples where accelerator 300 is installed in computing system 710, input subsystem 302 may connect to communication infrastructure 712 to enable accelerator 300 to interact with other components of computing system 710. While shown as separate subsystems, input subsystem 302 and output subsystem 308 may be implemented a single input/output (I/O) system.

Density-aware logical unit 304 and sparsity-aware logical unit 306 may be coupled to input subsystem 302 and may include various components and/or logical constructs configured to detect density and sparsity within vectors and/or matrices. In some embodiments, density-aware logical unit 304 and sparsity-aware logical unit 306 may be implemented as a single integral system. Both density-aware logical unit 304 and sparsity-aware logical unit 306 may be coupled to dot-product engine 310, and sparsity-aware logical unit 306 may also be coupled to queues 276(1)-(3).

FIG. 4 is a flow diagram of an exemplary computer-implemented method 400 for dot-product multiplication using sparsity-aware processing elements. The steps shown in FIG. 4 may be performed by any suitable computer-executable code and/or computing system, including the system(s) illustrated in FIGS. 1-3 and 5, and 7. In one example, each of the steps shown in FIG. 4 may represent an algorithm whose structure includes and/or is represented by multiple sub-steps, examples of which will be provided in greater detail below.

At step 410, the systems described herein may receive first and second vectors as operands of a full dot-product operation. For example, input subsystem 302 may receive first and second vectors as operands of a full dot-product operation. Input subsystem 302 may receive the first and second vectors from a variety of locations. For example, input subsystem 302 may receive the first and second vectors from another computational component within accelerator 300. Alternatively, input subsystem 302 may receive the vectors from an external device (e.g., from an external memory device) in response to a request from accelerator 300 or in response to another trigger.

Input subsystem 302 may also receive the vectors in any suitable manner. For example, input subsystem 302 may receive the vectors as two input streams of data. As another example, input subsystem 302 may receive two matrices and extract the vectors from columns and/or rows of the matrices. Furthermore, input subsystem 302 may receive the vectors as inputs, or operands for a dot-product operation. For example, input subsystem may receive (e.g., from another device or subsystem) preprocessed vectors of equal length that are intended for use in a dot-product operation. Alternatively, input subsystem may receive data in matrices or other formats and may process the data (e.g., by selecting two equal-length strings of values) for use in a dot-product operation.

At step 420, the systems described herein may perform, via a sparsity-aware dot-product accelerator, adaptive dot-product processing. For example, dot-product engine 310 may perform, via accelerator hardware (e.g., processing elements 274(1)-(3)), adaptive dot-processing operations. The phrase "sparsity-aware," in some examples, may be used to refer to any component of a system that may be able to identify zero-value elements in vectors or matrices. Additionally, "sparsity-aware" may refer to any component coupled to or otherwise associated with (e.g., positioned on the same hardware accelerator as, or in the same processing chain as) an element capable of identifying sparsity.

Dot-product engine 310 may perform adaptive dot-processing operations in a variety of ways. For example, and as noted in step 420(a) of FIG. 4, the systems and methods described herein may identify, within first and second vectors, at least one zero-value element. In one example, sparsity-aware logical unit 306 may identify zero-value elements in the input vectors. Sparsity-aware logical unit 306 may identify zero-value elements in a variety of ways. For example, sparsity-aware logical unit 306 may be implemented as a multiplexer configured to determine whether either element of a computational pair of elements (e.g., elements in corresponding positions of two input vectors) is zero-valued. Sparsity-aware logical unit 306 may also be implemented using any other suitable logical construct.

Sparsity-aware logical unit 306 may be disabled or bypassed in some embodiments (e.g., embodiments where processing overhead of sparsity-aware logical unit 306 may be close to, or greater than, any savings gained by skipping zero-value elements). For example, density-aware logical-unit 304 may process incoming vectors or matrices to determine their density (e.g., how many non-zero elements they have, the percentage of non-zero elements they have, etc.). Density-aware logical unit 304 may determine density in a variety of ways. For example, density-aware logical unit 304 may evaluate all or a portion of an input matrix or vector, may read metadata or receive other information indicative of the density of an input matrix or vector, etc. If density-aware logical unit 304 determines that at least one of the first and second vectors or matrices are dense (e.g., have less than predefined number or threshold of zero-value elements), density-aware logical unit 304 may cause sparsity-aware logical unit 306 to be bypassed or disabled.

Returning to FIG. 4, at step 420(b), which may be a sub-step of adaptive dot-product processing at step 420, one or more of the systems and methods described herein may execute, in response to identifying the zero-value element, a reduced dot-product operation. The term "reduced dot-product operation," in some examples, may refer to any dot-product operation that skips or excludes at least one computation involving a zero-value element. For example, a full dot-product operation may perform multiplication and accumulation operations for each pair of elements of the input vectors. In contrast, a reduced dot-product operation, which may be more efficient than a full dot-product operation, may bypass, skip, or eliminate multiplication and/or accumulation operations for one or more zero-value element pairs of the input vectors.

The systems and methods presented herein may perform a reduced dot-product operation in any suitable manner. For example, dot-product engine 310 may direct one or more of processing elements 274(1)-(3) to eliminate (e.g., bypass or skip) any or all mathematical operations involving zero-value elements (e.g., operations in which a zero-value element is an operand). Additionally or alternatively, sparsity-aware logical unit 306 may distinguish between zero-value and non-zero element pairs and may only enqueue non-zero element pairs (or may exclude one or more zero-value element pairs from enqueuing) in queues 276(1)-(3) for processing may processing elements 274(1)-(3).

In some examples, dot-product engine 310 may also perform load-balancing during a reduced dot-product operation by evaluating queues 276(1)-(3) to find, for example, the shortest queue, and distributing corresponding pairs of elements from the first and second vectors among the plurality of processing units based on which processing element has the shortest queue.

At step 430, one or more of the systems described herein may send a result of the reduced dot-product operation to a storage subsystem (e.g., a cache, a memory device, etc.). For example, dot-product engine 272 may accumulate outputs (e.g., partial sums of dot-product operation) of processing elements 274(1)-(3) in cache 292. Dot-product engine 272 may cache the partial sums in a variety of ways. For example, dot-product engine 272 may cache the partial sums in a cache inline with an output bus of dot-product engine 272. The term "in-line," in some examples, generally refers to any storage unit that caches and/or accumulates partial sums in a manner that saves hits on other memory devices (e.g., SRAM 220).

As noted above, embodiments of the instant disclosure may provide a number of advantages and may be implemented in a variety of contexts. For example, a neural network may be trained for structured sparsity such that the filter maps may have a balanced and/or targeted number of non-zero elements. Such a neural network may realize significant processing efficiencies by implementing embodiments of the instant disclosure. Embodiments of the instant disclosure may also be implemented in a variety of other contexts.

FIG. 5 illustrates an exemplary network environment 500 (such as a social network environment) in which aspects of the present disclosure may be implemented. As shown, network environment 500 may include a plurality of computing devices 502(1)-(N), a network 504, and a server 506. Computing devices 502(1)-(N) may each represent a client device or a user device, such as a desktop computer, laptop computer, tablet device, smartphone, or other computing device. Each of computing devices 502(1)-(N) may include a physical processor (e.g., physical processors 530(1)-(N)), which may represent a single processor or multiple processors, and a memory device (e.g., memory devices 540(1)-(N)), which may store instructions (e.g., software applications) or data.

Computing devices 502(1)-(N) may be communicatively coupled to server 506 through network 504. Network 504 may be any communication network, such as the Internet, a Wide Area Network (WAN), or a Local Area Network (WAN), and may include various types of communication protocols and physical connections.

As with computing devices 502(1)-(N), server 506 may represent a single server or multiple servers (e.g., a data center). Server 506 may host a social network or may be part of a system that hosts the social network. Server 506 may include a data storage subsystem 520, which may store instructions as described herein, and a hardware processing unit 560, which may include one or more processors and data storage units used for performing inference calculations for layers of a neural network. In some examples, the term "inference" generally refers to the process of causing a trained neural network to apply the learning gained from training to new data. Similarly, the term "training," in some examples, generally refers to the process of using a training dataset to teach a neural network new inference (e.g., classification) capabilities.

The terms "hardware processing unit" and "hardware processor" may, in some examples, refer to various types and forms of computer processors. In some examples, a hardware processing unit may include a central processing unit and/or a chipset corresponding to a central processing unit. Additionally or alternatively, a hardware processing unit may include a hardware accelerator (e.g., an AI accelerator, a video processing unit, a graphics processing unit, etc.) and may be implemented via one or more of a variety of technologies (e.g., an application-specific integrated circuit (ASIC), a field-programmable gate arrays (FPGA), etc.).

The term "special-purpose hardware" may, in some examples, refer to various types and forms of processors and other logical units and hardware elements that may be arranged, designed, or otherwise configured to perform one or more tasks more efficiently than general purpose computing systems (e.g., general purpose processors and/or memory devices). For example, some of the special-purpose hardware described herein may be configured to perform convolution lowering and/or matrix multiplication more efficiently and/or effectively than general purpose Central Processing Units (CPUs).

As noted, server 506 may host a social network, and in such embodiments, computing devices 502(1)-(N) may each represent an access point (e.g., an end-user device) for the social network. In some examples, a social network may refer to any type or form of service that enables users to connect through a network, such as the Internet. Social networks may enable users to share various types of content, including web pages or links, user-generated content such as photos, videos, posts, and/or to make comments or message each other through the social network.

In some embodiments, server 506 may access data (e.g., data provided by computing devices 502(1)-(N)) for analysis. For example, server 506 may perform various types of machine learning tasks on data. For instance, server 506 may use machine learning algorithms to perform speech recognition (e.g., to automatically caption videos), to enable computer vision (e.g., to identify objects in images, to classify images, to identify action in video, to turn panoramic photos into interactive 360 images, etc.), in recommender systems (e.g., information filtering systems that predict user preferences), for facial recognition and human pose estimation, in document analysis, and/or to perform a variety of other tasks.

In addition to being applied in a variety of technical fields, embodiments of the instant disclosure may also be applied to numerous different types of neural networks. For example, the systems and methods described herein may be implemented in any AI scheme that is designed to provide brain-like functionality via artificial neurons. In some examples (e.g., recurrent neural networks and/or feed-forward neural networks), these artificial neurons may be non-linear functions of a weighted sum of inputs that are arranged in layers, with the outputs of one layer becoming the inputs of a subsequent layer.

Figure 6:
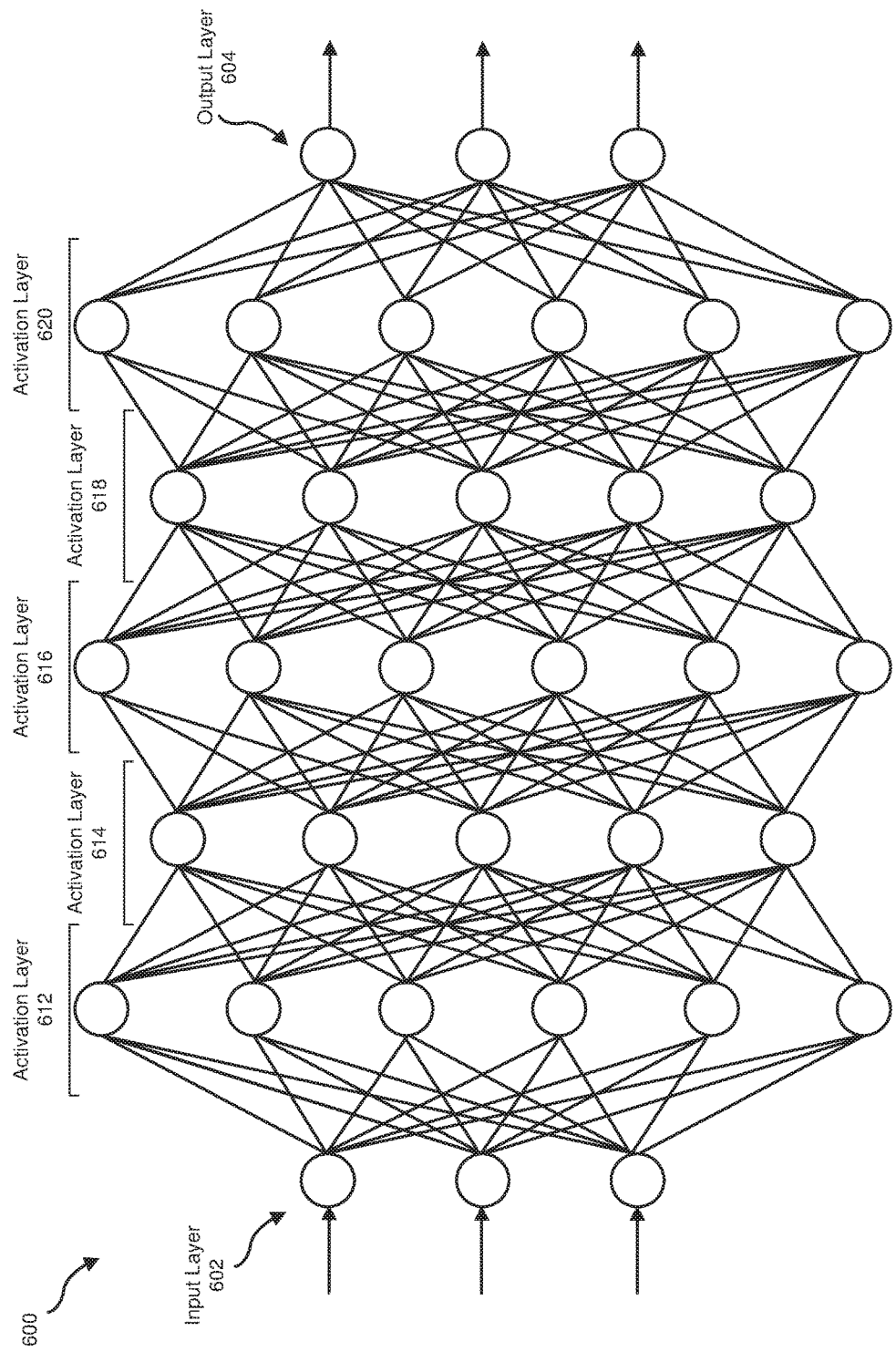
FIG. 6 is a diagram of nodes within an exemplary neural network in which sparsity-aware processing may be performed.
Figure 7:
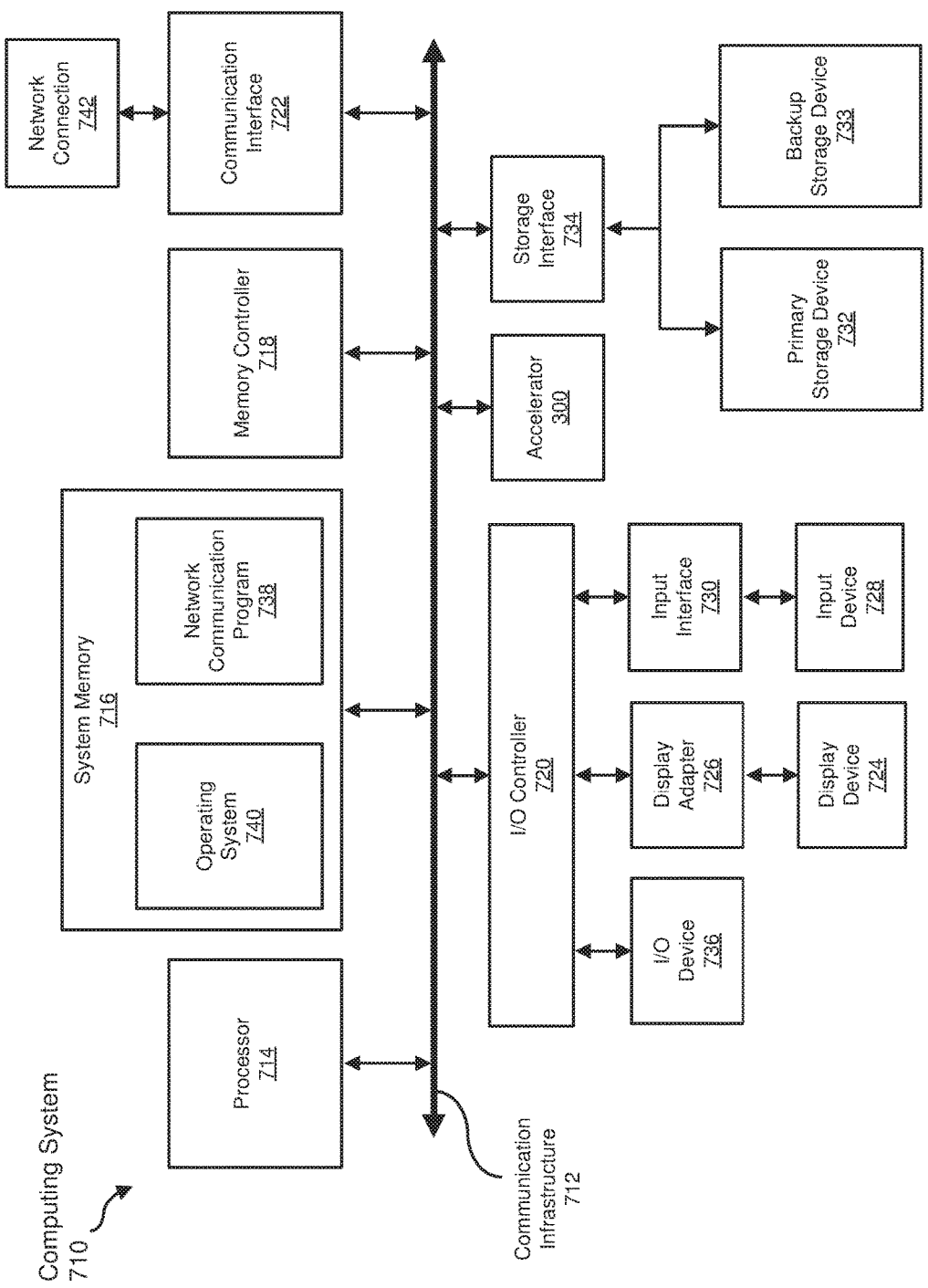
FIG. 7 is a block diagram of an example computing system capable of implementing one or more of the embodiments described and/or illustrated herein.

FIG. 6 is a block diagram of an exemplary feed-forward neural network 600 capable of benefiting from one or more of the embodiments described herein. Neural network 600 may include an input layer 602, an output layer 604, and a series of five activation layers-activation layer 612, activation layer 614, activation layer 616, activation layer 618, and activation layer 620. While FIG. 6 provides an example with five activation layers, neural network 600 may include any other suitable number of activation layers (e.g., one activation layer, dozens of activation layers, thousands of activation layers, etc.).

In the example shown in FIG. 6, data flows from input layer 602 through activation layers 612-620 to output layer 604 (i.e., from left to right). As shown, each value from the nodes of input layer 602 may be duplicated and sent to the nodes of activation layer 612. At activation layer 612, a set of weights (i.e., a filter) may be applied to the layer inputs, and each node may output a weighted sum to activation layer 614. This process may be repeated at each activation layer in sequence to create outputs at output layer 604.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 4). All or a portion of computing system 710 may also perform and/or be a means for performing any other steps, methods, or processes described and/or illustrated herein. In some embodiments, computing system 710 may include accelerator 300, which may be interconnected with other components of computing system 710 via a communication infrastructure 712.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below).

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, a communication interface 722, and accelerator 600 each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or ASIC incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an ASIC adapted to implement one or more of the example embodiments disclosed herein.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, CPUs, Field-Programmable Gate Arrays (FPGAs) that implement softcore processors, ASICs, portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive matrices to be transformed, transform the matrices, output a result of the transformation to produce partial sums, use the result of the transformation to produce an output matrix, and store the result of the transformation to perform an inference of a neural network. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A special-purpose, hardware-based accelerator comprising:
    an input subsystem configured to receive first and second vectors as operands of a full dot-product operation;
    a sparsity-aware logical element configured to identify sparsity;
    a sparsity-aware dot-product engine communicatively coupled to the input subsystem, wherein:
        the sparsity-aware dot-product engine is configured to perform adaptive dot-product processing by:
            identifying, with the sparsity-aware logical element, at least one zero-value element within the first and second vectors; and
            executing, in response to identifying the zero-value element, a reduced dot-product operation that excludes, relative to the full dot-product operation, at least one mathematical operation in which the zero-value element is an operand; and
        the sparsity-aware dot-product engine is further configured to:
            determine that at least one of the first and second vectors are from dense matrices that have fewer than a predetermined number of zero-value elements; and
            in response to determining that at least one of the first and second vectors are from dense matrices, disable the sparsity-aware logical element; and
    an output subsystem that is communicatively coupled to the sparsity-aware dot-product engine and configured to send a result of the reduced dot-product operation to a storage subsystem.

2. The special-purpose, hardware-based accelerator of claim 1, wherein the at least one mathematical operation in which the zero-value element is an operand comprises at least one of:
    a multiplication calculation; and
    an accumulation calculation.

3. The special-purpose, hardware-based accelerator of claim 1, wherein the first vector is from a data matrix of a neural network layer and the second vector is from a filter matrix for the neural network layer.

4. The special-purpose, hardware-based accelerator of claim 1, wherein the sparsity-aware dot-product engine comprises:
    a plurality of processing elements configured to perform multiply-accumulate operations; and
    a processing queue for each processing element in the plurality of processing elements.

5. The special-purpose, hardware-based accelerator of claim 4, wherein the sparsity-aware dot-product engine is configured to, based on an evaluation of the processing queues of the processing elements, distribute corresponding pairs of elements from the first and second vectors among the plurality of processing elements.

6. The special-purpose, hardware-based accelerator of claim 5, wherein the evaluation of the processing queues comprises identifying a shortest queue of the processing queues.

7. The special-purpose, hardware-based accelerator of claim 5, further comprising a cache within the storage subsystem, wherein the cache is configured to store and accumulate partial sums received as output from the processing elements of the sparsity-aware dot-product engine.

8. The special-purpose, hardware-based accelerator of claim 1, further comprising a cache within the storage subsystem, wherein the cache is configured to store and accumulate partial sums received as output from processing elements of the sparsity-aware dot-product engine.

9. The special-purpose, hardware-based accelerator of claim 1, further comprising a density-aware logical element configured to determine that at least one of the first and second vectors are from dense matrices and in response to determining that at least one of the first and second vectors are from dense matrices, disable the sparsity-aware logical element.

10. A computing system comprising:
a memory device configured to store a first matrix and a second matrix;
a hardware processor configured to identify a first vector of the first matrix and a second vector of the second matrix as operands of a full dot-product operation;
a sparsity-aware logical element configured to identify sparsity;
a sparsity-aware dot-product accelerator communicatively coupled to the hardware processor, wherein:
the sparsity-aware dot-product accelerator is configured to perform adaptive dot-product processing by:
identifying, with a sparsity-aware logical element, at least one zero-value element within the first and second vectors; and
executing, in response to identifying the zero-value element, a reduced dot-product operation that excludes, relative to the full dot-product operation, at least one mathematical operation in which the zero-value element is an operand; and
the sparsity-aware dot-product accelerator is further configured to:
determine that at least one of the first and second vectors are from dense matrices that have fewer than a predetermined number of zero-value elements; and
in response to determining that at least one of the first and second vectors are from dense matrices, disable the sparsity-aware logical element; and
an output subsystem that is communicatively coupled to the sparsity-aware dot-product accelerator and configured to send a result of the reduced dot-product operation to a storage subsystem.

11. The computing system of claim 10, wherein the at least one mathematical operation in which the zero-value element is an operand comprises at least one of:
a multiplication calculation; and
an accumulation calculation.

12. The computing system of claim 10, wherein the first vector is from a data matrix of a neural network layer and the second vector is from a filter matrix for the neural network layer.

13. The computing system of claim 10, wherein the sparsity-aware dot-product accelerator comprises:
a plurality of processing elements configured to perform multiply-accumulate operations; and
a processing queue for each processing element in the plurality of processing elements.

14. The computing system of claim 13, further comprising load-balancing logic configured to, based on an evaluation of the processing queues of the processing elements, distribute corresponding pairs of elements from the first and second vectors among the plurality of processing elements.

15. The computing system of claim 10, further comprising a cache within the storage subsystem, wherein the cache is configured to store and accumulate partial sums received as output from a plurality of processing elements of the sparsity-aware dot-product accelerator.

16. A method comprising:
receiving first and second vectors as operands of a full dot-product operation;
performing, by a sparsity-aware dot-product accelerator, adaptive dot-product processing by:
identifying, with a sparsity-aware logical element, at least one zero-value element within the first and second vectors;
executing, in response to identifying the zero-value element, a reduced dot-product operation that excludes, relative to the full dot-product operation, at least one mathematical operation in which the zero-value element is an operand;
determining that at least one of the first and second vectors are from dense matrices that have fewer than a predetermined number of zero-value elements;
in response to determining that at least one of the first and second vectors are from dense matrices, disabling the sparsity-aware logical element and performing the full dot-product operation; and
sending a result of the dot-product operation to a storage subsystem.

17. The method of claim 16, wherein the at least one mathematical operation in which the zero-value element is the operand comprises at least one of:
a multiplication calculation; and
an accumulation calculation.

18. The method of claim 16, wherein the first vector is from a data matrix of a neural network layer and the second vector is from a filter matrix for the neural network layer.

19. The method of claim 16, wherein the sparsity-aware dot-product accelerator comprises:
a plurality of processing elements configured to perform multiply-accumulate operations; and
a processing queue for each processing element in the plurality of processing elements.

20. The method of claim 19, further comprising performing load-balancing by distributing, based on an evaluation of the processing queues of the processing elements, corresponding pairs of elements from the first and second vectors among the plurality of processing elements.

* * * * *